US012634560B2

(12) United States Patent
Fan et al.

(10) Patent No.: US 12,634,560 B2
(45) Date of Patent: May 19, 2026

(54) INFORMATION DISPLAY METHOD, APPARATUS, ELECTRONIC DEVICE, AND COMPUTER-READABLE MEDIUM

(71) Applicant: BEIJING YOUZHUJU NETWORK TECHNOLOGY CO., LTD., Beijing (CN)

(72) Inventors: Kequan Fan, Beijing (CN); Lu Cheng, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 100 days.

(21) Appl. No.: 18/540,277

(22) Filed: Dec. 14, 2023

(65) Prior Publication Data

US 2024/0205506 A1     Jun. 20, 2024

(30) Foreign Application Priority Data

Dec. 20, 2022     (CN) .......................... 202211641064.0

(51) Int. Cl.
H04N 21/2343          (2011.01)
H04N 21/25          (2011.01)
(Continued)

(52) U.S. Cl.
CPC ..... H04N 21/47815 (2013.01); H04N 21/472 (2013.01); H04N 21/812 (2013.01)

(58) Field of Classification Search
None
See application file for complete search history.

(56) References Cited

U.S. PATENT DOCUMENTS 10,972,797 B2     4/2021   Wang
2009/0228922 A1*   9/2009   Haj-Khalil .......... G06F 3/04845
                                              725/38
(Continued)

FOREIGN PATENT DOCUMENTS

CN          102243299 A      11/2011
CN          105844494 A       8/2016
(Continued)

OTHER PUBLICATIONS

International Search Report dated Feb. 21, 2024 in PCT/CN2023/137931, English translation (9 pages).
(Continued)

*Primary Examiner* — Brian T Pendleton
*Assistant Examiner* — Jean D Saint Cyr

(57)          ABSTRACT

The present application discloses an information display method, method comprises: when a video display page is being displayed on the electronic device, and the video display page is used to display multiple candidate video data corresponding to the video display page, if the target video data in these candidate video data is being played on the video display page, then when it is determined that a preset guidance condition corresponding to the target video data is reached, a guidance control corresponding to the target video data and guidance prompt text corresponding to the guidance control are added on the video display page, so that after receiving a trigger operation for the guidance control, jumping directly from the video display page to the object aggregation page, so that it is possible to achieve the purpose of directly entering the object aggregation page from a piece of video data.

18 Claims, 11 Drawing Sheets

...lay target video data on a video display page, the target video data being any of multiple candidate video data corresponding to the video display page — S1

Add a guidance control corresponding to the target video data and a guidance prompt text corresponding to the guidance control on the video display page when a preset guidance condition corresponding to the target video data is reached — S2

In response to a trigger operation for the guidance control, jump from the video display page to the object aggregation page, the object aggregation page being used to display multiple first objects, the first objects being determined from multiple candidate objects corresponding to the guidance prompt text. — S3

(51) Int. Cl.

| | |
|---|---|
| *H04N 21/254* | (2011.01) |
| *H04N 21/422* | (2011.01) |
| *H04N 21/431* | (2011.01) |
| *H04N 21/466* | (2011.01) |
| *H04N 21/472* | (2011.01) |
| *H04N 21/478* | (2011.01) |
| *H04N 21/482* | (2011.01) |
| *H04N 21/81* | (2011.01) |

(56) References Cited

U.S. PATENT DOCUMENTS

| | | | |
|---|---|---|---|
| 2012/0304065 A1 | 11/2012 | Cai | |
| 2016/0094875 A1* | 3/2016 | Peterson | H04N 21/4312 |
| | | | 725/41 |
| 2018/0101286 A1* | 4/2018 | Hu | G06F 3/04847 |
| 2018/0146257 A1 | 5/2018 | Seo et al. | |
| 2019/0164209 A1 | 5/2019 | Park | |
| 2024/0231570 A1 | 7/2024 | Song et al. | |

FOREIGN PATENT DOCUMENTS

| | | | |
|---|---|---|---|
| CN | 108462889 | A | 8/2018 |
| CN | 110909616 | A | 3/2020 |
| CN | 113608651 | A | 11/2021 |
| CN | 113760150 | A | 12/2021 |
| CN | 113792181 | A | 12/2021 |
| CN | 113849682 | A | 12/2021 |
| CN | 114756785 | A | 7/2022 |
| JP | 2014519277 | A | 12/2016 |
| JP | 2019201393 | A | 11/2019 |
| JP | 2019537400 | A | 9/2020 |
| KR | 10-2243299 | B1 | 4/2021 |
| KR | 1020220075695 | A | 6/2022 |
| WO | 2014/011139 | A1 | 1/2014 |

OTHER PUBLICATIONS

Office Action issued in JP Appl. No. 2024-572352 on Dec. 2, 2025, English translation (12 pages).
Extended European Search Report for EP Patent Application No. 23905749.0, Issued on Mar. 13, 2026, 10 pages.

* cited by examiner

Figures 11, 12:
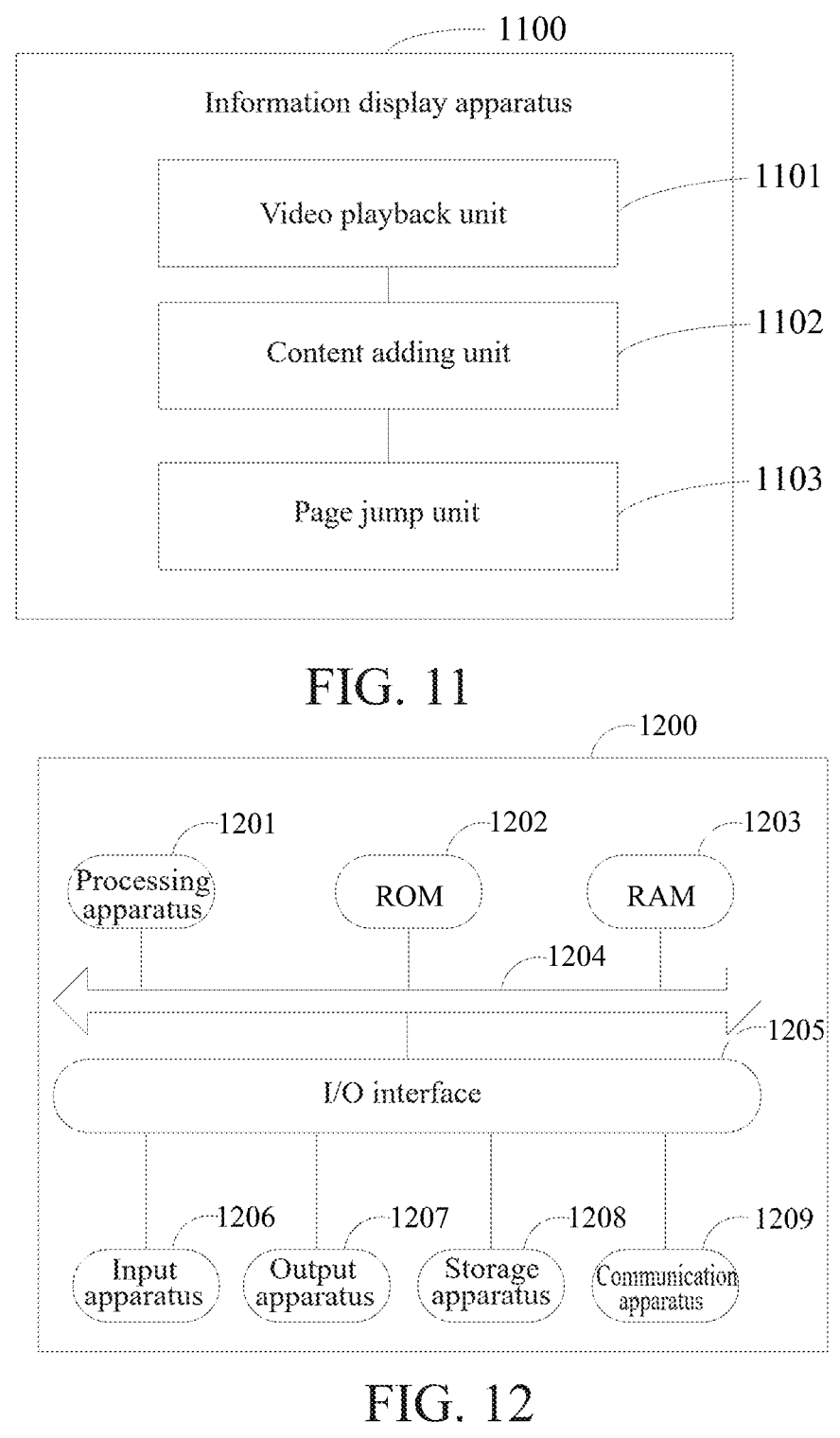

1100

Information display apparatus

Video playback unit     1101

Content adding unit     1102

Page jump unit     1103

1201 Processing apparatus     1202 ROM     1203 RAM

1204

1205

I/O interface

1206 Input apparatus     1207 Output apparatus     1208 Storage apparatus     1209 Communication apparatus

INFORMATION DISPLAY METHOD, APPARATUS, ELECTRONIC DEVICE, AND COMPUTER-READABLE MEDIUM

TECHNICAL FIELD

The present application is based on and claims priority of China Application No. 202211641064.0, filed on Dec. 20, 2022, the disclosure of which is incorporated by reference herein in its entirety.

The present application relates to the field of Internet technology, and in particular to an information display method, apparatus, electronic device, and computer-readable medium.

BACKGROUND

For some clients (for example, clients with video data display functions), the clients can provide users with many ways to place orders. For example, when the client is displaying a recommended video stream, a user can view one or more pieces of video data from the recommended video stream, and view or place orders for products corresponding to these video data. For another example, when the client is displaying a mall page, a user can view one or more product cards from the mall page, and view or place orders for products corresponding to these product cards.

SUMMARY

The present application provides an information display method, apparatus, electronic device, and computer-readable medium.

The present application provides an information display method, the method comprising:

playing target video data on a video display page, the target video data being any of multiple candidate video data corresponding to the video display page;

adding a guidance control corresponding to the target video data and a guidance prompt text corresponding to the guidance control on the video display page when a preset guidance condition corresponding to the target video data is reached; and in response to a trigger operation for the guidance control, jumping from the video display page to an object aggregation page, the object aggregation page being used to display multiple first objects, the first objects being determined from multiple candidate objects corresponding to the guidance prompt text.

In some implementations, if the target video data satisfies an entry identification display condition, an object entry identification corresponding to the target video data is displayed on the video display page;

after the playing target video data on a video display page, the method further comprising:

in response to a trigger operation for the object entry identification, displaying an object display interface corresponding to the target video data on the video display page, the object display interface being used to display multiple second objects corresponding to the target video data;

in response to a display cancellation operation triggered for the object display interface, cancelling the display of the object display interface on the video display page;

when it is determined that an order operation has not been triggered for any of the second objects in the object display interface, determining that the preset guidance condition corresponding to the target video data is reached.

In some implementations, the multiple candidate objects include similar objects corresponding to the multiple second objects; the similar objects being different from the second objects; and/or, the first objects are determined from the multiple candidate objects according to recommendation characterization data of each of the candidate objects; the recommendation characterization data being determined according to the similarity between the candidate objects and the second objects.

In some implementations, if the target video data satisfies the entry identification display condition, when the object display interface corresponding to the target video data is displayed on the video display page, the preset guidance condition corresponding to the target video data is: cancelling the display of the object display interface on the video display page, and during the display of the object display interface, no ordering operation being triggered for any of the second objects in the object display interface; the object display interface is used to display multiple second objects corresponding to the target video data.

In some implementations, if the target video data does not satisfy the entry identification display condition, the preset guidance condition corresponding to the target video data is: the playback progress of the target video data reaching a preset progress threshold.

In some implementations, the object aggregation page includes multiple sets of recommended objects, and object categories corresponding to each set of recommended objects are different; the multiple sets of recommended objects include a set of target objects, the set of target object including the multiple first objects; after the jumping from the video display page to an object aggregation page, the method further comprising:

displaying the set of target objects on the object aggregation page.

In some implementations, a binding page corresponding to the guidance control includes the multiple first objects;

after the jumping from the video display page to an object aggregation page, the method further comprising:

displaying the binding page on the object aggregation page.

In some implementations, the video display page displays association information of the target video data;

the method further comprising:

when the preset guidance condition corresponding to the target video data is reached, cancelling the display of the association information of the target video data on the video display page.

In some implementations, the preset guidance condition corresponding to the target video data is determined according to the video type of the target video data.

In some implementations, the displayed content on the guidance control is determined according to the page identification of the object aggregation page.

In some implementations, the object aggregation page includes a search trigger area;

after the jumping from the video display page to an object aggregation page, the method further comprising:

displaying a target search word in the search trigger area, the target search word being determined according to multiple second objects corresponding to the target video data;

in response to a preset operation triggered for the search trigger area, displaying object search results corresponding to the target search word on the object aggregation page.

In some implementations, the object aggregation page is a platform page.

The present application provides an information display apparatus, comprising:

a video playback unit configured to play target video data on a video display page, the target video data being any of multiple candidate video data corresponding to the video display page;

a content adding unit configured to add a guidance control corresponding to the target video data and a guidance prompt text corresponding to the guidance control on the video display page when a preset guidance condition corresponding to the target video data is reached;

a page jump unit configured to, in response to a trigger operation for the guidance control, jump from the video display page to an object aggregation page, the object aggregation page being used to display multiple first objects, the first objects being determined from multiple candidate objects corresponding to the guidance prompt text.

The present application provides an electronic device, the device comprising: a processor and a memory;

the memory is configured to store instructions or computer programs; the processor is configured to execute the instructions or computer programs in the memory, so that the electronic device executes the information display method provided by the present application.

The present application provides a computer-readable medium having instructions or computer programs stored thereon, which, when run on a device, cause the device to execute the information display method provided by the present application.

The present application provides a computer program product, which includes a computer program carried on a non-transitory computer-readable medium. The computer program includes program code for executing the information display method provided by the present application.

BRIEF DESCRIPTION OF THE DRAWINGS

In order to explain technical solutions in the embodiments of the present application or the related art more clearly, drawings needed to be used in the description of the embodiments or the related art will be briefly introduced below. Apparently, the drawings in the following description are only some embodiments recorded in the present application. For those of ordinary skill in the art, other drawings can be obtained according to these drawings without exerting creative efforts.

4

Figure 8:
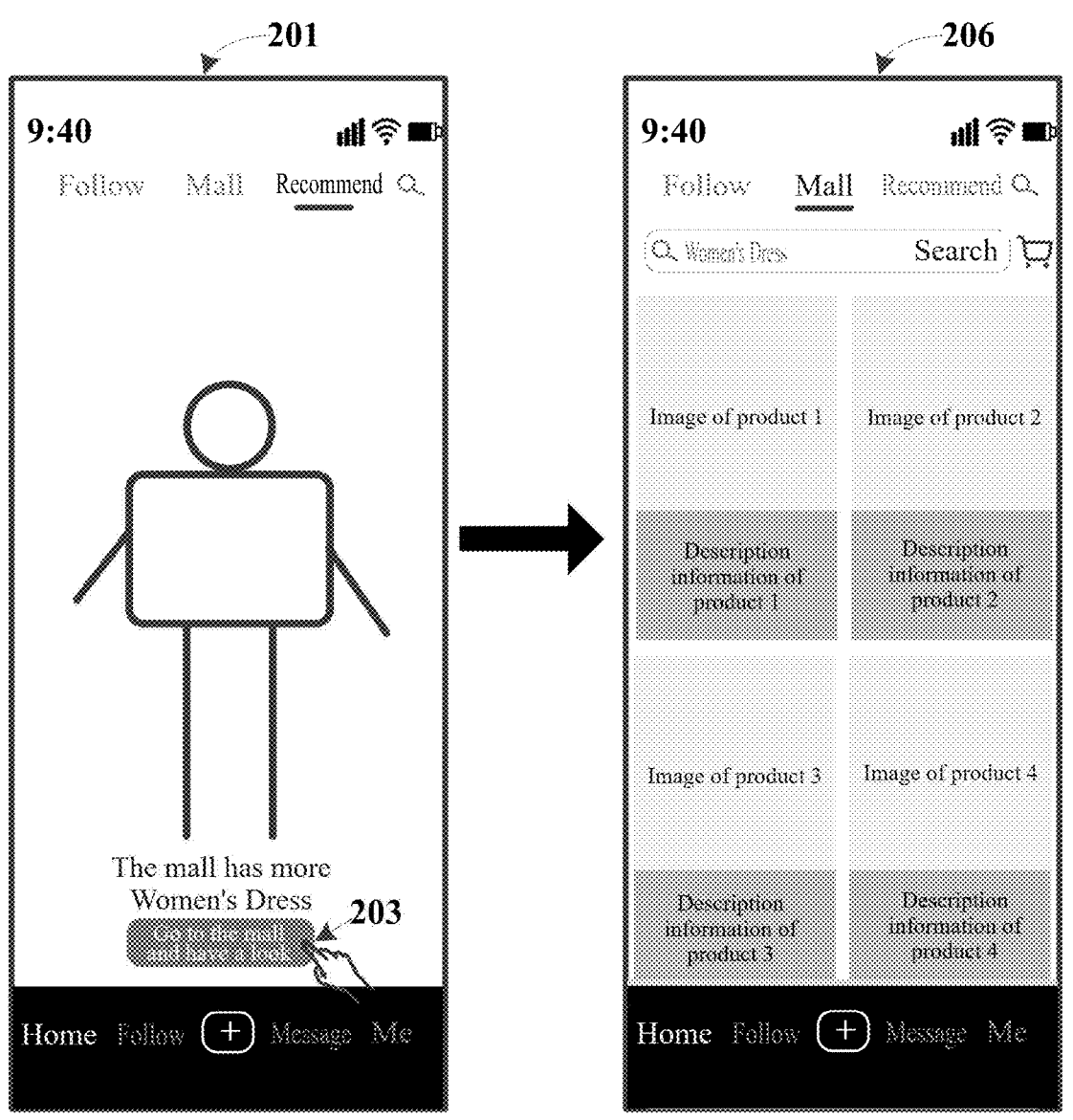
Figure 9:
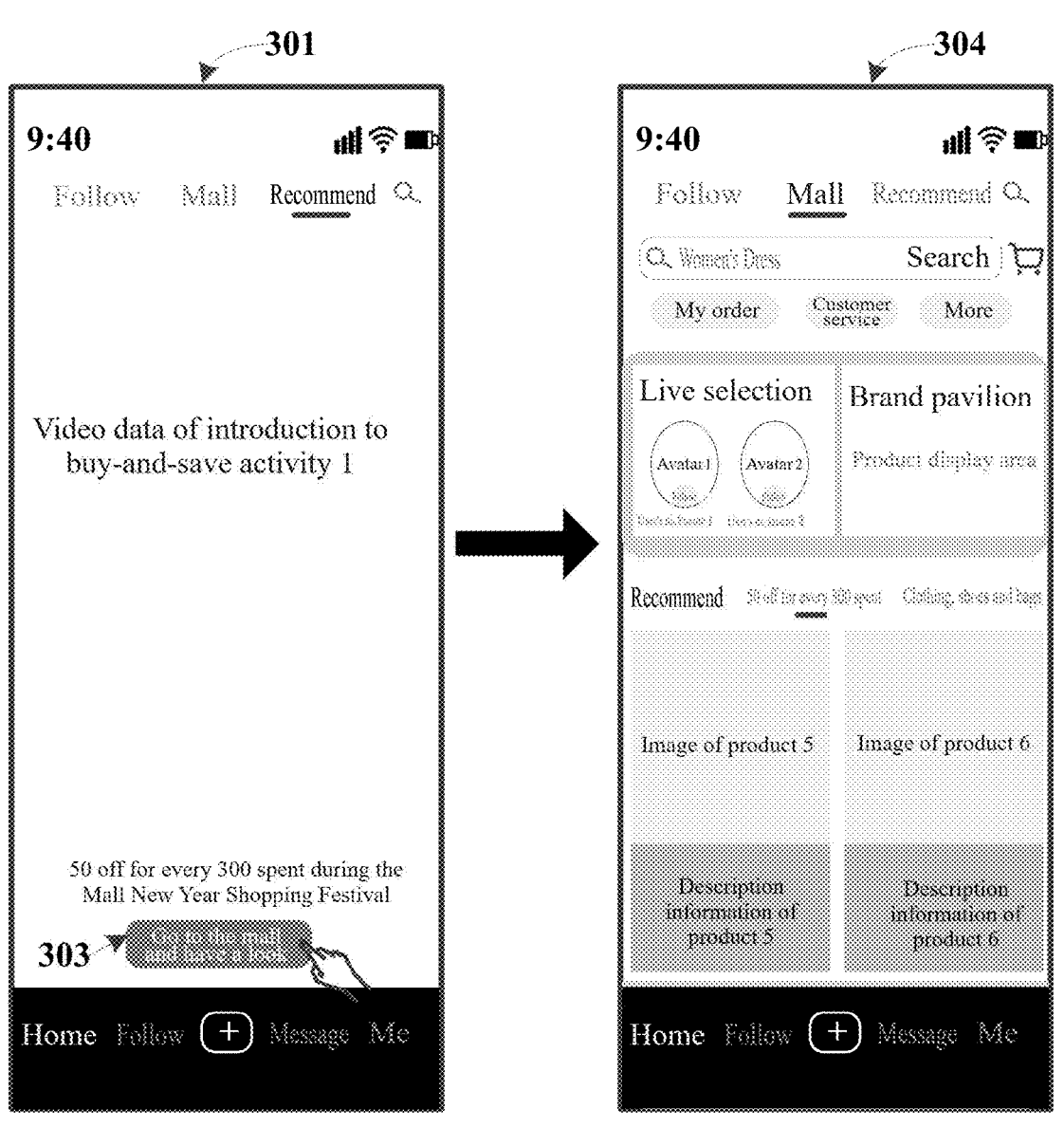
Figure 10:
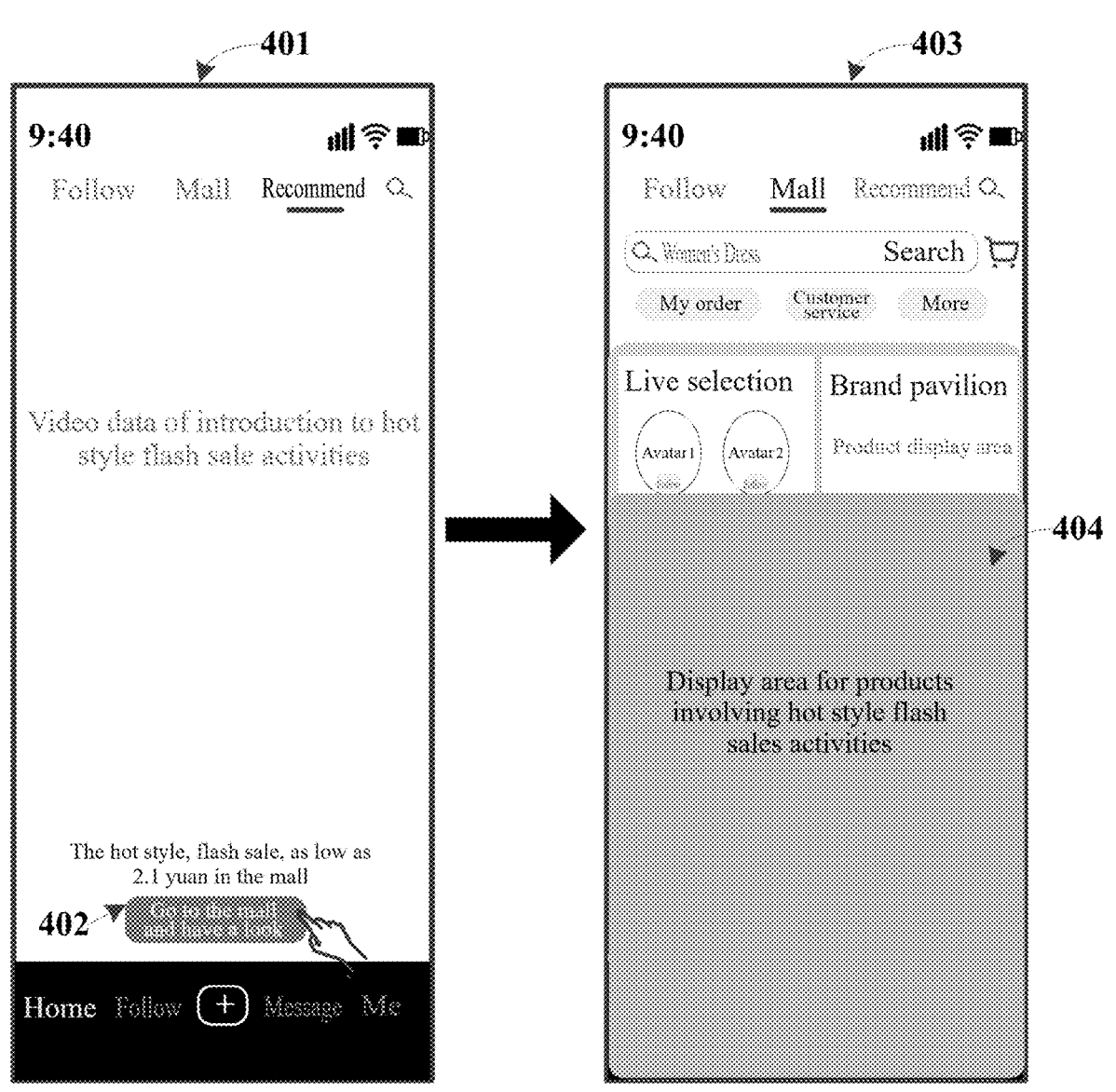

FIG. 8 is a schematic diagram of a display process of an object aggregation page provided by the present application;

FIG. 9 is a schematic diagram of a display process of an object aggregation page provided by the present application;

FIG. 10 is a schematic diagram of a display process of an object aggregation page provided by the present application;

FIG. 11 is a schematic structural diagram of an information display apparatus provided by an embodiment of the present application;

FIG. 12 is a schematic structural diagram of an electronic device provided by an embodiment of the present application.

DETAILED DESCRIPTION

For some clients (for example, clients with video data display functions), the clients can provide users with many ways to place orders. For example, when the client is displaying a recommended video stream, a user can view one or more pieces of video data from the recommended video stream, and view or place orders for products corresponding to these video data. For another example, when the client is displaying a mall page, a user can view one or more product cards from the mall page, and view or place orders for products corresponding to these product cards.

However, since there are flaws in the way some clients adopted to view products, the user experience is affected by those flaws.

Specifically, research has found that, for the way some clients adopted to view products, when a user is viewing products by means of one or more pieces of video data in the recommended video stream, if the user wants to enter a mall page, the user needs to exit a display page of the recommended video stream first, and then enter the mall page through a series of operations, which makes the process of entering the mall page more complicated, thus affecting the user experience.

Based on the above findings, in order to solve the technical problems mentioned in the Background section, the present application provides an information display method. The method comprises: when a video display page is being displayed on the electronic device, and the video display page is used to display a video stream composed of multiple candidate video data corresponding to the video display page, if target video data in these candidate video data is being played on the video display page, then when it is determined that a preset guidance condition corresponding to the target video data is reached, adding a guidance control corresponding to the target video data and guidance prompt text corresponding to the guidance control on the video display page, so that the guidance prompt text can indicate that a user can directly enter an object aggregation page (for example, a platform page) by means of the guidance control, and can also indicate which objects the user viewed in the object aggregation page (for example, products involved in buy-and-save activities, etc.), so that after receiving a trigger operation for the guide control, jumping directly from the video display page to the object aggregation page, so that the object aggregation page is used to display multiple first objects, and these first objects are all determined from multiple candidate objects corresponding to the guidance prompt text. In this way, the purpose of directly entering the object aggregation page from a piece of video data can be achieved, thereby effectively simplifying the entry process of the object aggregation page, and further effectively alleviating the adverse effects caused by the complicated entry process of the object aggregation page, which can effectively improve the user experience.

In addition, the embodiments of the present application do not limit the execution subject of the information display method provided by the embodiments of the present application. For example, the information display method provided by the embodiments of the present application may be applied to terminal devices. As another example, the information display method provided by the embodiments of the present application may also be implemented by means of a data interaction process between a terminal device and a server. Wherein, the terminal device may be a smartphone, a computer, a Personal Digital Assistant (PDA), a tablet computer, etc. The server may be a standalone server, a cluster server or a cloud server.

In order to enable those skilled in the art to better understand the solutions of the present application, the technical solutions in the embodiments of the present application will be clearly and completely described below in conjunction with the accompanying drawings in the embodiments of the present application. Apparently, the described embodiments are only part not all of the embodiments of the present application. Based on the embodiments in the present application, all other embodiments obtained by those of ordinary skilled in the art without creative efforts fall within the scope of protection of the present application.

Figure 1:
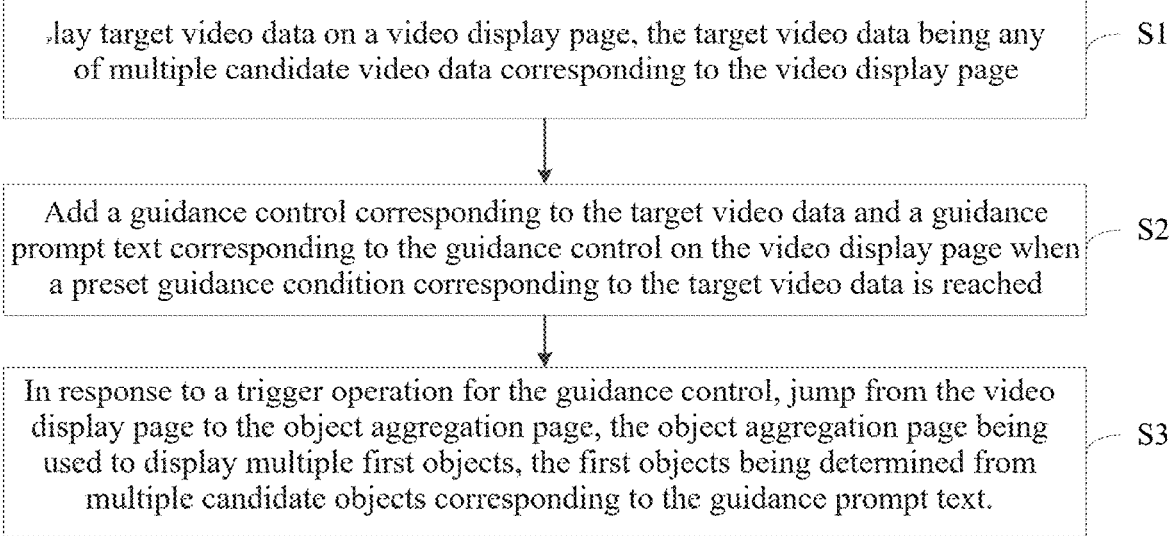
FIG. 1 is a flowchart of an information display method provided by the present application.

In order to better understand the technical solutions provided by the present application, the information display method provided by the present application will be described below with reference to some drawings. As shown in FIG. 1, the information display method provided by an embodiment of the present application includes the following S1-S3. Wherein, FIG. 1 is a flowchart of an information display method provided by the present application.

S1: Play target video data on a video display page, the target video data being any of multiple candidate video data corresponding to the video display page.

Wherein, the video display page refers to a page with a video data display function; and the video display page is not limited in the present application. For example, in some application scenarios (for example, short videos, live broadcasts, etc.), the video display page may be a page with a video stream display function (for example, page 200 in FIG. 2 or page 300 in FIG. 3).

In fact, for the above "video display page", the video display page may be used to display multiple candidate video data corresponding to the video display page. Wherein, the candidate video data refers to video data that can be displayed using the video display page. It should be noted that the present application does not limit the display manner of these candidate video data on the video display page. For example, it may specifically include: arranging these candidate video data in a certain order in advance to form a video stream (for example, the video stream corresponding to the "recommended" tag shown in FIG. 2 or FIG. 3), so that these candidate video data can be displayed in this order on the video display page.

The target video data refers to video data being played on the "video display page" above; and the target video data is not limited in the present application. For example, it may be any of video data of multiple candidate video data corresponding to the video display page.

In fact, in some application scenarios (for example, product-related scenarios), in order to better satisfy the user experience, the present application further provides some implementations of the above target video data. In this implementation, the target video data satisfies at least the conditions shown in ①-② below.

① The above target video data belongs to the above "multiple candidate video data corresponding to the video display page". That is, the target video data is one piece of video data that can be displayed by means of the video display page.

② The above target video data satisfies a preset product display condition. That is, the target video data is related to one or more products.

Wherein, the product display condition may be set in advance according to the application scenario. For ease of understanding, it will be explained in conjunction with two examples below.

Example 1, in some application scenarios, the above product display condition may be: the target video data being used to display one or more products.

It should be noted that the present application does not limit the target video data that satisfies the product display condition in the above paragraph. For example, the target video data may refer to a trailer video (for example, the video data shown in FIG. 2) or an advertising video. Wherein, the trailer video is used to provide users with relevant interactive processes (for example, interactive processes such as displaying product details, placing orders, etc.) of some products by means of video data, so that the users can purchase these products by means of the trailer video. The advertising video is used to recommend one or more products to users by means of video data, so that the users can learn about and/or purchase these products by means of the advertising video.

Example 2: in some other application scenarios, the above product display condition may be: the target video data being used to introduce one or more product-related activities (for example, promotion activities, buy-and-save activities, etc.).

It should be noted that the present application does not limit the target video data that satisfies the product display condition in the above paragraph. For example, the target video data may refer to a video introducing buy-and-save activities (for example, the video data shown in FIG. 3), a video introducing promotion activities, etc. Wherein, the video introducing buy-and-save activities is used to introduce to users a buy-and-save discount method for all or part of the products by means of video data. The video introducing promotion activities is used to introduce to users a promotion method for all or part of the products by means of video data.

Figure 2:
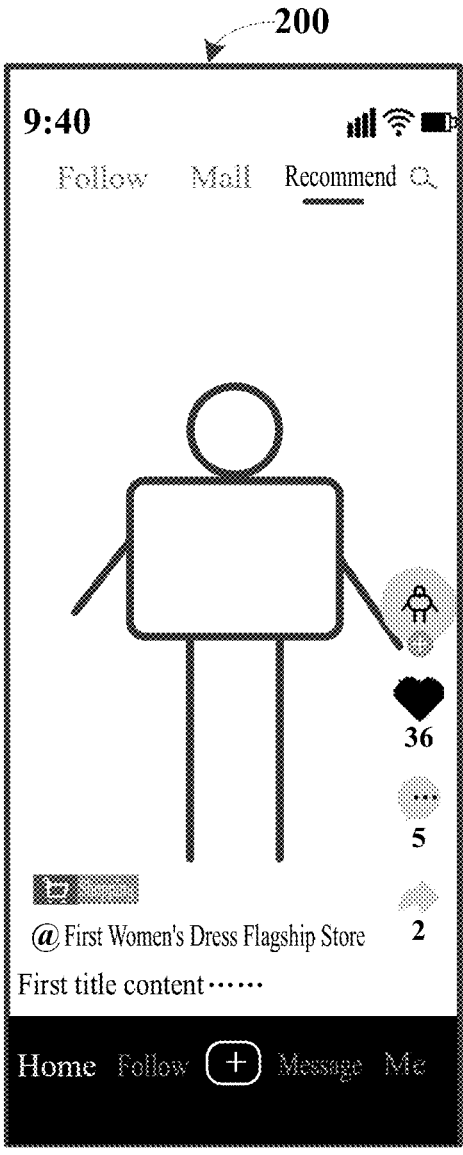
FIG. 2 is a schematic diagram of a video display page provided by the present application.
Figure 3:
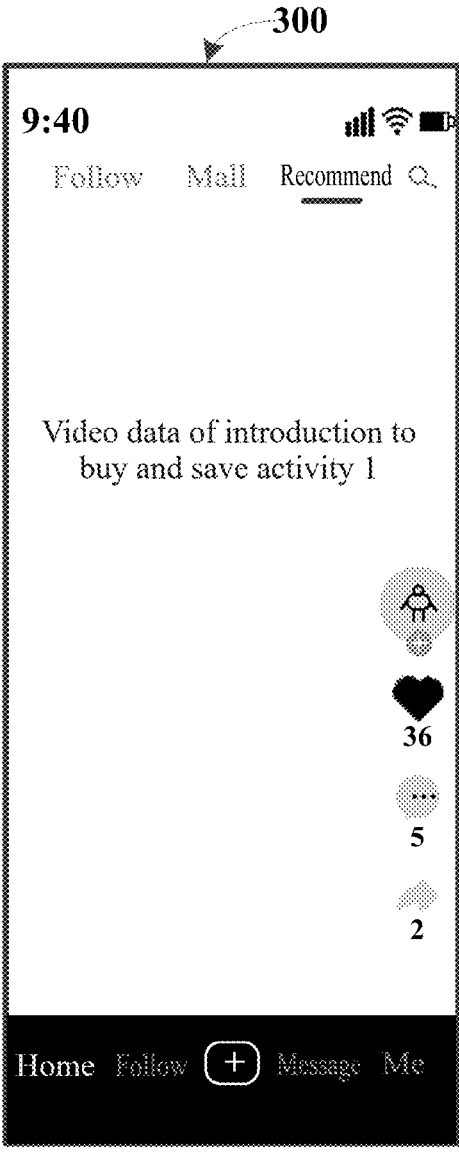
FIG. 3 is a schematic diagram of a video display page provided by the present application.

Based on the conditions shown in ① to ② above, it may be known that, in some implementations, the above target video data may refer to video data related to a product in a playback state existing in the above "multiple candidate video data corresponding to the video display page" (for example, the video data shown in FIG. 2 or FIG. 3).

Based on the relevant content of S1 above, it may be known that, for an electronic device, when a video display page (for example, page 200 in FIG. 2 or page 300 in FIG. 3) is being displayed on the electronic device, the video display page may display to users multiple candidate video data corresponding to the video display page in sequence, to enable the users to learn about the relevant content of the product by means of these candidate video data, so that when the target video data is played on the video display page, the users can learn about some product-related information from the target video data (for example, product introduction content, buy-and-save activities, etc.).

S2: Add a guidance control corresponding to the target video data and a guidance prompt text corresponding to the guidance control on the video display page when a preset guidance condition corresponding to the target video data is reached.

The above "a preset guidance condition corresponding to the target video data" refer to a condition set in advance for the target video data and used to display mall guidance information by means of the target video data; and the present application does not limit the acquisition method of the "preset guidance condition corresponding to the target video data". For example, it can be manually set by relevant personnel in advance.

In addition, the present application does not limit the implementation of the above "preset guidance condition corresponding to the target video data". For ease of under-standing, the description will be made in conjunction with two cases below.

Case 1: In some application scenarios (for example, a trailer video and other scenarios), if a user can directly place an order for one or more products by means of the above target video data (for example, the video data shown in FIG. 2), the "preset guidance condition corresponding to the target video data" may specifically be: after the user enters product-related pages corresponding to the target video data (for example, product details pages or an in-stream pages, etc.) by means of the above video display page, the user does not place any order for the product by means of these product-related pages. For ease of understanding, the description will be made in conjunction with the example below.

As an example, if the above target video data satisfies the entry identification display condition, an object entry iden-tification corresponding to the target video data is displayed on the above video display page, and determination process of the "preset guidance condition corresponding to the target video data" is shown in steps 11 to 13 below.

Step 11: In response to a trigger operation for the object entry identification corresponding to the above target video data, display an object display interface corresponding to the target video data on the above video display page, the object display interface being used to display multiple second objects corresponding to the target video data.

Figure 4:
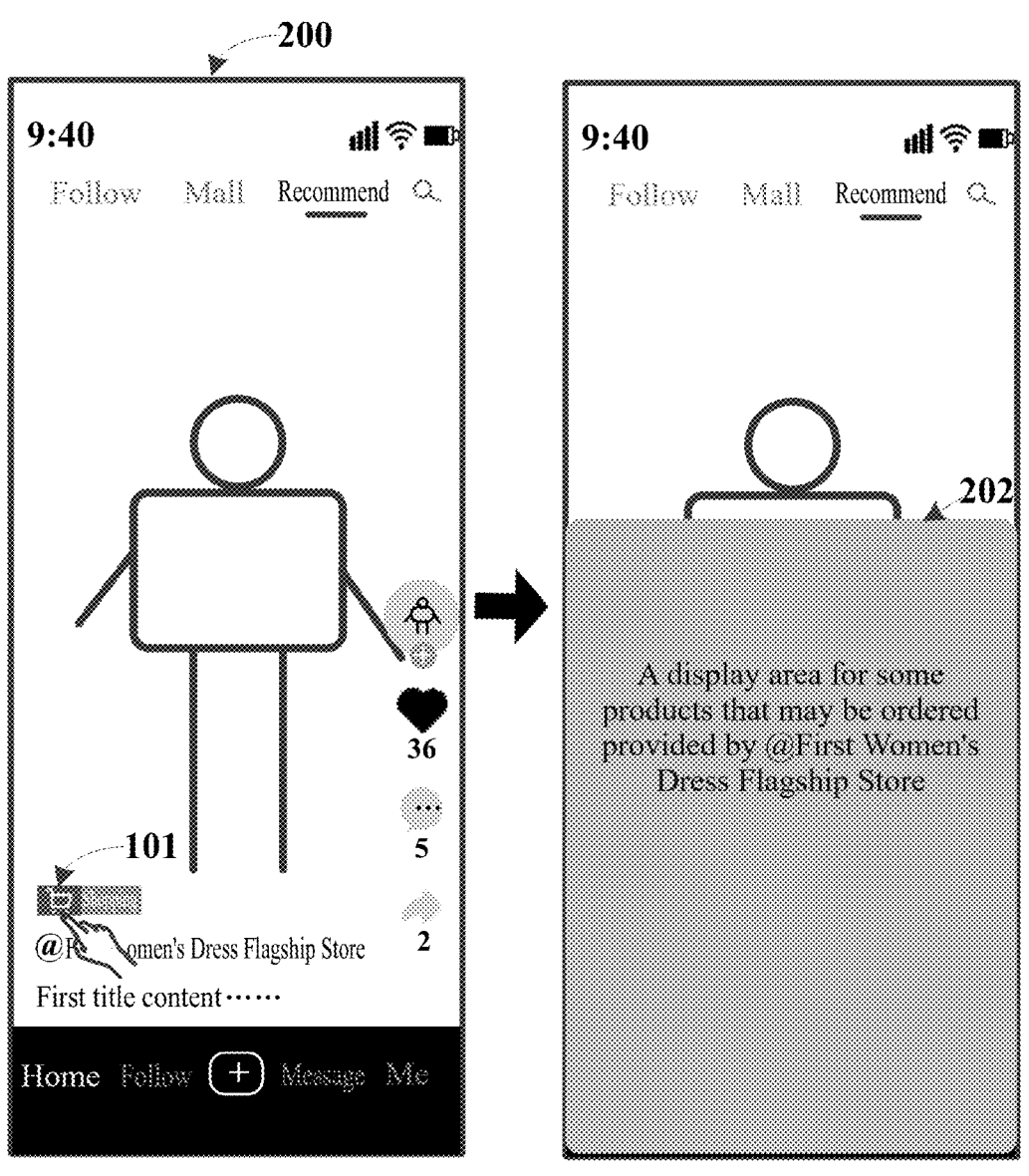
FIG. 4 is a schematic diagram of a video display page provided by the present application.

Wherein, the entry identification display condition is used to determine whether to display an object entry identification on a piece of video data, so that subsequent users can view some objects corresponding to the video data by means of the object entry identification. It should be noted that the present application does not limit the object. For example, the object may refer to a commodity that may be purchased (for example, a skirt, etc.) or a service that may be enjoyed (for example, a haircut, etc.). In addition, the present appli-cation does not limit the object entry identification. For example, it may be implemented by means of the icon 101 shown in FIG. 4. In addition, the present application does not limit "some objects corresponding to the video data". For example, it may refer to objects displayed using the video data (for example, trailer products, etc.).

The above "object entry identification corresponding to the target video data" refers to an identification displayed on the target video data to guide users to view some objects corresponding to the target video data; and the present application does not limit the implementation of the "object entry identification corresponding to the target video data". For example, it can be implemented by means of the icon 101 shown in FIG. 4.

In addition, the present application does not limit the implementation of the "trigger operation for the object entry identification corresponding to the above target video data" involved in step 11 above. For example, it may be a click operation.

The above "object display interface corresponding to the target video data" is used to aggregate and display multiple second objects corresponding to the target video data. Wherein, the second objects refer to objects that can be displayed by means of the target video data (for example, trailer products, etc.).

In addition, the present application does not limit the above "object display interface corresponding to the target video data". For example, it may be implemented by means of page 202 shown in FIG. 4.

In addition, the present application does not limit the display manner of the above "object display interface cor-responding to the target video data". For example, it may be displayed by means of a drop-down page (for example, the drop-down page adopted in page 202 in FIG. 4).

Based on the relevant content of step 11 above, it may be known that, for an electronic device, when a video display page (for example, page 200 in FIG. 4) is being displayed on the electronic device, target video data (for example, the video data shown in FIG. 4) is being played on the video display page, and an object entry identification correspond-ing to the target video data is also displayed on the video display page (for example, the icon 101 shown in FIG. 4), after the electronic device receives a trigger operation for the object entry identification (for example, the click operation shown in FIG. 4), an object display interface corresponding to the target video data (for example, page 202 shown in FIG. 4) is directly displayed on the video display page, so that the object display interface can display multiple second objects corresponding to the target video data to users, so that subsequent users may implement some interactive operations (for example, viewing product details, placing orders, etc.) on these second objects by means of the object display interface.

Step 12: In response to a display cancellation operation triggered for the above object display interface, cancel the display of the object display interface on the above video display page.

Wherein, the display cancellation operation is used to trigger a display cancel process for the above object display interface, so as to achieve the purpose of returning to the above video display page from the object display interface.

In addition, the present application does not limit the implementation of the above "display cancellation opera-tion". For example, it may be implemented by adopting any existing or future emerging method that can perform display cancellation processing for a drop-down page (for example, click a page close button on the drop-down page, or trigger a sliding operation on the drop-down page, etc.).

Figure 5:
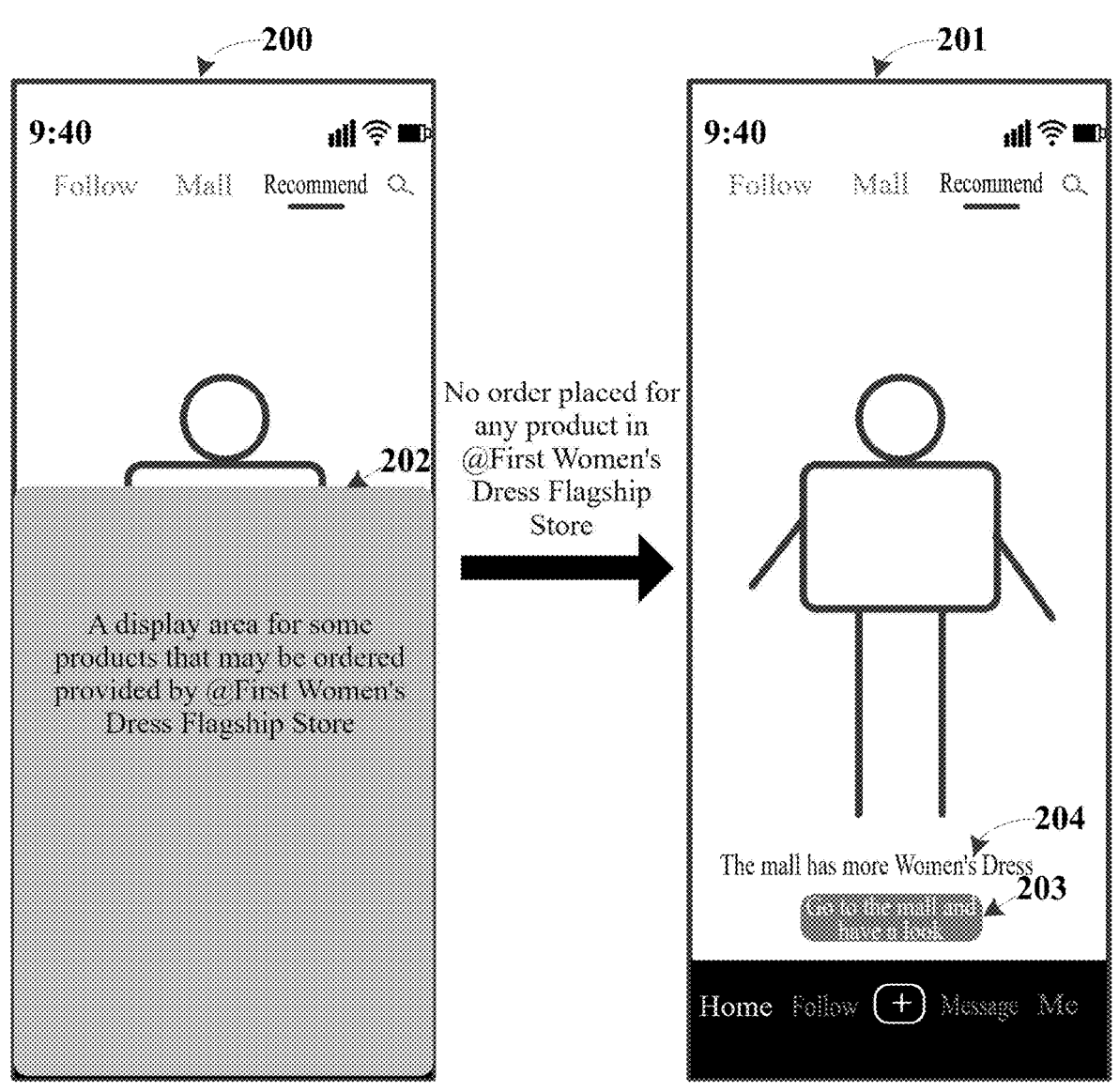
FIG. 5 is a schematic diagram of a video display page provided by the present application.

Based on the relevant content of step 11 above, it may be known that, for an electronic device, when a video display page (for example, page 200 in FIG. 5) is being displayed on the electronic device, target video data is being played on the video display page, and an object display interface corre-sponding to the target video data (for example, page 202 shown in FIG. 5) is being displayed on the video display page, after the electronic device receives a display cancel-lation operation triggered for the object display interface, the display of the object display interface on the video display page is directly cancelled, so as to achieve the purpose of returning to the video display page (for example, page 201 shown in FIG. 5) from the object display interface.

Step 13: When it is determined that an order operation has not been triggered for any of the second objects in the above object display interface, determine that the preset guidance condition corresponding to the target video data is reached.

In the present application, if the user has not triggered an order operation for any of the second objects in the object display interface as of the time when returning from the above object display interface to the above video display page, it may be determined that the user has not triggered an order operation during the display of the object display interface, so it may be determined that the preset guidance condition corresponding to the target video data have been reached.

It should be noted that the present application does not limit the implementation of the "order operation" in step 13. For example, it may be implemented by adopting any existing or future emerging method that can perform order processing for an object.

Based on the relevant contents of steps 11 to 13 above, it may be known that, for an electronic device, when a video display page is being displayed on the electronic device, a target video data is being played on the video display page, and the target video data satisfies an entry identification display condition, after the electronic device receives some operations triggered for the video display page (for example, click on the icon 101 in FIG. 4), an object display interface (for example, the page 202 shown in FIG. 4) corresponding to the target video data is directly displayed, so that the user can use the object display interface to view and/or place orders for some products; until the electronic device receives a display cancellation operation triggered for the object display interface, it returns directly from the object display interface to the video display page, and at the same time, it is determined whether an order operation has been triggered during the display of the object display interface. If not, it may be determined that the preset guidance condition corresponding to the target video data has been reached.

Based on the relevant content of the above Case 1, it may be known that, in some implementations, if the above target video data satisfies the entry identification display condition, then when the above video display page displays an object display interface corresponding to the target video data, the above "preset guidance condition corresponding to the target video data" specifically may be: cancelling the display of the object display interface corresponding to the target video data on the video display page, and during the display of the object display interface, no order operation has been triggered for any of the second objects in the object display interface.

Case 2: In some other application scenarios (for example, product promotion and other scenarios), if a user cannot directly place an order for one or more products by means of the above target video data (for example, the video data shown in FIG. 3), the above "preset guidance condition corresponding to the target video data" may specifically be: the target video data is completely played or played to a preset video frame, etc.

Based on the relevant content of the above Case 2, it may be known that, in some implementations, if the above target video data does not satisfy the entry identification display condition, the above "preset guidance condition corresponding to the target video data" may specifically be: the playback progress of the target video data reaches a preset progress threshold. Wherein, the preset progress threshold may be set in advance. For example, it may be: the last video frame in the target video data is played.

Based on the relevant contents of the above "preset guidance condition corresponding to target video data", it may be known that, different types of video data correspond to different preset guidance condition. For example, the preset guidance condition corresponding to trailer video data (for example, the video data shown in FIG. 2) is: returning from the product-related page corresponding to the trailer video data to the above video display page, and no order operation has been triggered during the display of the product-related page. For another example, the preset guidance condition corresponding to activity category video data (for example, the video data shown in FIG. 3) is: the trailer video data is played to a preset progress threshold set in advance.

Based on the contents of the above paragraph, it may be known that, in order to better improve the user experience, the present application further provides a determination process of the above "preset guidance condition corresponding to the target video data". For example, it may specifically be: according to the video type of the target video data, determining a preset guidance condition corresponding to the target video data. Wherein, the video type is used to describe the type of the target video data (for example, trailer video type or product activity type, etc.).

In addition, the present application does not limit the implementation of the step "determining a preset guidance condition corresponding to the target video data according to the video type of the target video data" in the previous paragraph. For example, it may specifically be: a guidance condition searched from a pre-constructed mapping relationship corresponding to the video type of the target video data is determined as the preset guidance condition corresponding to the target video data. Wherein, the mapping relationship is used to record corresponding guidance conditions of different video types. Wherein, the relevant content for the object aggregation page may be referred to S3 below.

Figure 6:
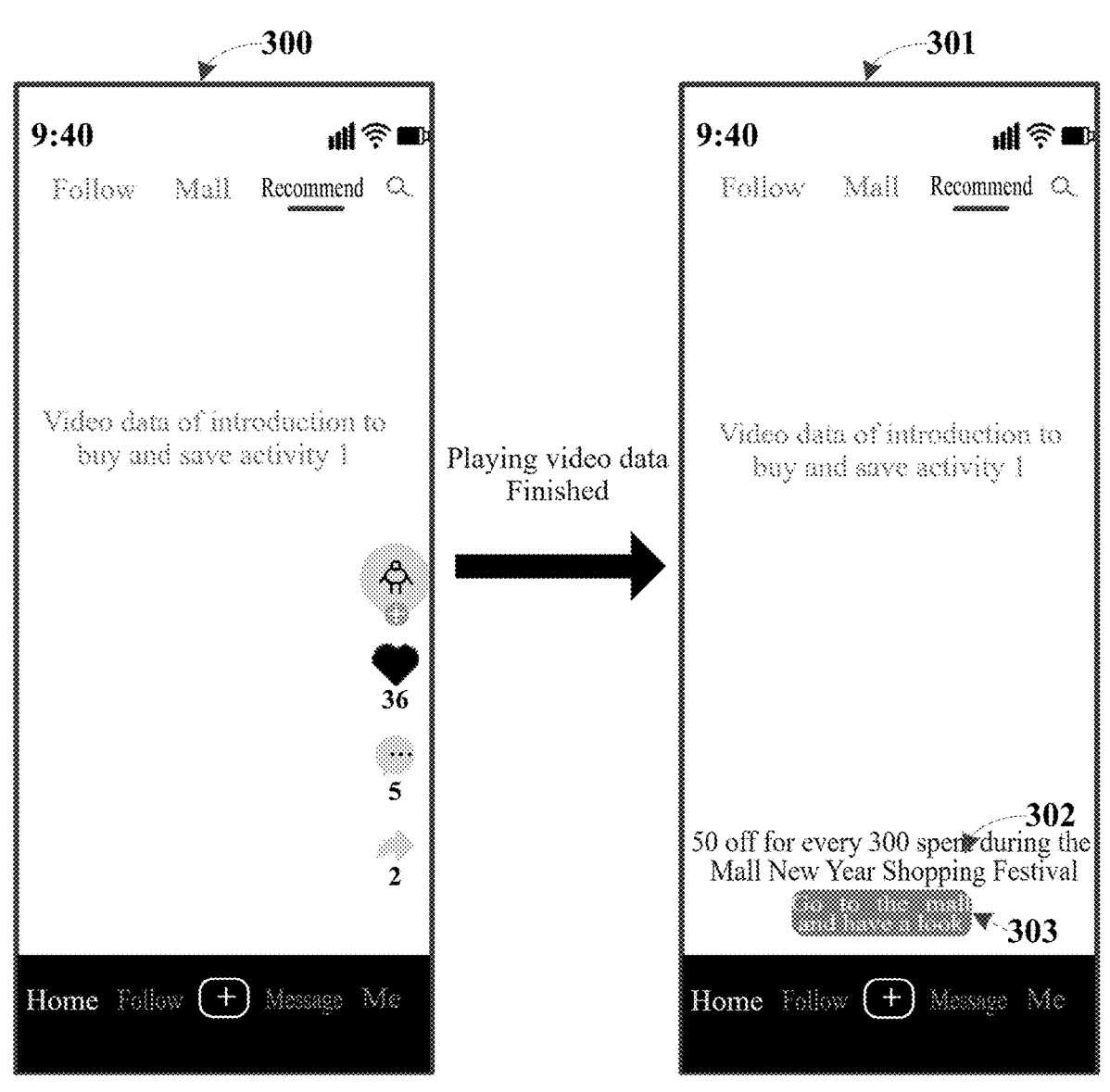
FIG. 6 is a schematic diagram of a video display page provided by the present application.

The above "guidance control corresponding to the target video data" is used to assist in implementation of jumping from the target video data to the following object aggregation page (for example, the home page of the mall, etc.); and the present application does not limit the implementation of the "guidance control corresponding to the target video data". For example, it may be implemented using the control 203 shown in FIG. 5 or the control 303 shown in FIG. 6.

In fact, in order to better improve the guidance effect, the present application further provides some implementations of the above "guidance control corresponding to the target video data". In this implementation, some guidance information (for example, the character string "Go to the mall" displayed on the control 203 in FIG. 5 or the control 303 in FIG. 6) is also displayed on the guidance control.

In addition, the present application does not limit the implementation of the display content on the above guidance control. For example, the display content may be determined according to the page identification of the object aggregation page below, so that the display content includes the page identification, thereby the display content can clearly indicate that it may jump directly to the object aggregation page by means of the guide control. Wherein, the relevant content of the object aggregation page may refer to S3 below; the "page identification of the object aggregation page" is used to identify the object aggregation page; and the present application does not limit the "page identification of the object aggregation page", for example, it may be a page tag of the object aggregation page (for example, the character string "mall").

The above "guidance prompt text corresponding to the guidance control" refers to the guidance character string configured in advance for the above "guidance control corresponding to the target video data", so that the "guidance prompt text corresponding to the guidance control" can assist the "guidance control corresponding to the target video data" to improve its guidance effect.

In addition, the present application does not limit the above "guidance prompt text corresponding to the guidance control". For example, when the above "guidance control corresponding to the target video data" is the control 203 in FIG. 5, the "guidance prompt text corresponding to the guidance control" may be the character string 204 "There are more women's dress in the mall". For another example, when the above "guidance control corresponding to the target video data" is the control 303 in FIG. 6, the "guidance prompt text corresponding to the guidance control" may be the character string 302 "50 off for every 300 spent during the Mall New Year Shopping Festival".

In addition, the present application does not limit the determination process of the above "guidance prompt text corresponding to the guidance control". For example, it may be manually configured by relevant personnel in advance for the above "guidance control corresponding to the target video data".

In fact, in order to better improve the guidance effect, the present application further provides some implementations of the above S2. In this implementation, when association information (for example, video title, etc.) of target video data is displayed on the above video display page, the S2 may specifically be: when a preset guidance condition corresponding to the target video data is reached, cancelling the display of the association information of the target video data on the video display page, and adding a guidance control corresponding to the target video data and guidance prompt text corresponding to the guidance control on the video display page, so that it can better highlight the guidance control and its corresponding guidance prompt text, thereby better improving the guidance effect.

The above "association information of the target video data" is used to describe some attributes of the target video data (for example, video title, video publishing account, number of video comments, number of video shares, number of video likes, etc.); and the present application does not limit the implementation of the association information. For example, when the target video data is the video data shown in FIG. 2, the association information of the target video data may refer to the information displayed within the page 200 in FIG. 2 that is related to the target video data. For another example, when the target video data is the video data shown in FIG. 3, the association information of the target video data may refer to the information displayed within the page 300 in FIG. 3 that is related to the target video data.

It should be noted that the present application does not limit the association relationship between the execution time of the above step "cancelling the display of the association information of the target video data on the video display page" and the execution time of the above step "adding a guidance control corresponding to the target video data and guidance prompt text corresponding to the guidance control on the video display page". For example, it may specifically be: the two being the same. For another example, it may also be: the former being earlier than the latter. For yet another example, it may also be: the latter being earlier than the former.

Based on the above three paragraphs, it may be known that, in some implementations, for an electronic device, when a video display page (for example, page 200 in FIG. 2 or page 300 in FIG. 3) is being displayed on the electronic device, target video data is being played on the video display page, and association information of the target video data is also displayed on the video display page (for example, video title, video publishing account, number of video comments, number of video shares, video likes number, etc.), if it is determined that a preset guidance condition corresponding to the target video data have been reached, a clearance processing may be performed first for the video display page, so that only the target video data is displayed on the video display page after clearance processing; then a guidance control corresponding to the target video data and guidance prompt text corresponding to the guidance control are added on the video display page, so that the guidance control and its corresponding guidance prompt text can be better highlighted, thereby better improving the guidance effect, which in turn helps to improve the user experience.

Based on the relevant content of S2 above, it may be known that, for an electronic device, when a video display page (for example, page 200 in FIG. 2 or page 300 in FIG. 3) is being displayed on the electronic device, and target video data is being played on the video display page, if it is determined that a preset guidance condition corresponding to the target video data have been reached, a guidance control corresponding to the target video data and guidance prompt text corresponding to the guidance control may be directly added to the video display page, so that the guidance control and its corresponding guidance prompt text can indicate to the user that the user may directly jump to the object aggregation page below to view products by means of the guidance control, which can better satisfy the experience of the user to view products.

S3: In response to a trigger operation for the guidance control, jump from the video display page to the object aggregation page, the object aggregation page being used to display multiple first objects, the first objects being determined from multiple candidate objects corresponding to the guidance prompt text.

Wherein, the object aggregation page is used to aggregate and display some objects. For example, the object aggregation page may be page 205 in FIG. 7, page 206 in FIG. 8, page 304 in FIG. 9, or page 403 in FIG. 10.

In addition, the present application does not limit the above object aggregation page, for example, it may be a platform page. Wherein, the platform page refers to a page in a certain shopping platform used to aggregate and display a plurality of objects (for example, a plurality of products). For example, the platform page may be a mall homepage.

In fact, for the above "object aggregation page", the object aggregation page may be used to display multiple first objects, so that users can perform some interactive operations on these first objects by means of the object aggregation page (for example, viewing product details, placing orders, etc.). Wherein, the first objects refer to objects displayed on the object aggregation page. In addition, the present application does not limit the first objects.

In fact, in order to better improve the user experience, the present application further provides a determination process of the above first objects, which may specifically be: determining the first objects from multiple candidate objects corresponding to the above guidance prompt text. Wherein, the "multiple candidate objects corresponding to the guidance prompt text" refer to some or all objects that are relatively closely associated with object description information in the guidance prompt text. The "object description information" refers to the information related to the objects that appears in the guidance prompt text (for example, the information "women's dress" that appears in the character string 204 in FIG. 5, the information "50 off for every 300 spent during the New Year Shopping Festival" that appears in the character string 302 in FIG. 6, the information "hot style, flash sale, as low as 2.1 yuan" shown in FIG. 10). In addition, the present application does not limit the implementation of "multiple candidate objects corresponding to the guidance prompt text".

In fact, in some application scenarios (for example, the trailer video and other scenarios), in order to better improve the user experience, the present application further provides some implementations of the above "multiple candidate objects corresponding to the guidance prompt text". In this implementation, when the above target video data is used to display multiple second objects, the "multiple candidate objects corresponding to the guidance prompt text" may specifically include similar objects corresponding to the multiple second objects, and the similar objects are different from the second objects, so that the "multiple candidate objects corresponding to the guidance prompt text" can represent other objects that are relatively similar to the objects displayed in the target video data. Wherein, the "similar objects corresponding to the second objects" refer to other objects that are relatively similar to the second objects; and the present application does not limit the determination process of the "similar objects corresponding to the second objects".

In addition, the present application does not limit the implementation of the above step "determine the first objects from multiple candidate objects corresponding to the above guidance prompt text". For example, it may specifically be: according to recommendation characterization data of each of the candidate objects, determining the first objects from the multiple candidate objects, so that the recommendation characterization data of the first objects reaches a preset recommendation condition.

Wherein, the recommendation characterization data of the i-th candidate object is used to represent the possibility of recommending and displaying the i-th candidate object to the user. And i is a positive integer, i≤I, and I is a positive integer, which represents the number of objects in the above "multiple candidate objects".

In addition, the embodiment of the present application does not limit the implementation of the above "recommendation characterization data of the i-th candidate object". For example, it may be implemented by adopting any existing or future emerging method that can determine the recommendation characterization data of an object (e.g., based on user preferences).

In fact, in order to better improve the object recommendation effect, the present application further provides some implementations of the above "recommendation characterization data of the i-th candidate object". In this implementation, when the above target video data is used to display multiple second objects, and the "multiple candidate objects corresponding to the guidance prompt text" include similar objects corresponding to the multiple second objects, the determination process of the "recommendation characterization data of the i-th candidate object" may specifically be: determining the recommendation characterization data of the i-th candidate object according to the similarity between the i-th candidate object and the second object corresponding to the i-th candidate object, so that the "recommendation characterization data of the i-th candidate object" can represent the similarity between the i-th candidate object and the object displayed in the target video data, which is beneficial to subsequently recommending to the user some objects that are relatively similar to the objects displayed in the target video data. Wherein, the i-th candidate object refers to a similar object of the "second object corresponding to the i-th candidate object". The "similarity" is used to characterize the similarity between the i-th candidate object and the second object corresponding to the i-th candidate object.

It should be noted that the present application does not limit the implementation of the above step "determining the recommendation characterization data of the i-th candidate object according to the similarity between the i-th candidate object and the second object corresponding to the i-th candidate object".

The above "preset recommendation condition" may be set in advance. For example, the preset recommendation condition may specifically be: the recommendation characterization data of the above first object reaches a preset recommendation threshold. For another example, the preset recommendation condition may specifically be: after sorting the recommendation characterization data of all candidate objects from large to small, the corresponding arrangement position of the first object is lower than a preset position threshold. Wherein, the preset recommendation threshold and the preset position threshold may both be set in advance.

Based on the relevant content of the above "first objects", it may be known that, in some application scenarios (for example, trailer video and other scenarios), the first objects may refer to objects that the user may like and is relatively similar to the objects displayed in the above target video data. In other application scenarios (for example, certain mall activities, certain product advertisements, etc.), the first objects may refer to objects that the user may like and satisfy product filtering requirements corresponding to the target video data (for example, product filtering requirements configured for a certain mall activity, product filtering requirements configured for certain product advertisement, etc.).

In addition, the present application does not limit the display manner of the above "multiple first objects". For ease of understanding, the description will be made in conjunction with two cases below.

Case 1: In some application scenarios, the above "multiple first objects" may come from a set of objects corresponding to a certain tag in the above object aggregation page (for example, the set of products corresponding to the tag "recommended" in FIG. 7, or the set of products corresponding to the tag "50 off for every 300 spent" in FIG. 9, etc.).

Based on the relevant content of Case 1 in the above paragraph, it may be known that, in some implementations, when the above object aggregation page includes multiple sets of recommended objects, object categories corresponding to each set of recommended objects are different, the multiple sets of recommended object include a set of target objects, and when the set of target object includes the multiple first objects above, the above S3 may specifically be: in response to a trigger operation for the above guidance control, jumping from the above video display page to the object aggregation page, and displaying the set of target objects on the object aggregation page, so that the purpose of positioning and displaying the set of target objects directly on the video display page can be achieved, so that the user can directly see these first objects on the video display page.

Wherein, the j-th set of recommended objects refers to a set of objects existing in the above object aggregation page;

and the present application does not limit the j-th set of recommended objects, for example, when the object aggregation page includes the j-th sub-page tag, the j-th set of recommended objects refers to a set of objects that can be displayed by means of the sub-page corresponding to the j-th sub-page tag. The j-th sub-page tag refers to a sub-page tag that exists in the object aggregation page; and the present application does not limit the j-th sub-page tag. For example, it may be the "recommended" tag in FIG. 7, or "50 off for every 300 spent" tag . . . . And j is a positive integer, j≤J, J is a positive integer, which represents the number of sets in the "multiple sets of recommended objects" above.

The object category corresponding to the j-th set of recommended objects is used to indicate the category to which all objects in the j-th set of recommended objects belong. For example, when the j-th set of recommended objects refers to a set objects corresponding to the tag "recommended" in FIG. 7, the object category corresponding to the j-th set of recommended objects may be the category "recommended". For another example, when the j-th set of recommended objects refers to a set of objects corresponding to the tag "50 off for every 300 spent" in FIG. 9, the object category corresponding to the j-th set of recommended objects may be the category "50 off for every 300 spent".

The above "a set of target objects" refers to the set of recommended objects configured in advance for the above target video data, so that when jumping from the target video data to the above object aggregation page, the set of target objects is directly displayed to the user. For example, when the target video data is the video data shown on page 201 in FIG. 7, the set of target objects may be a set of objects corresponding to the category "recommended" shown on page 205 in FIG. 7. For another example, when the target video data is the video data shown on page 301 in FIG. 9, the set of target objects may be a set of objects corresponding to the category "50 off for every 300 spent" shown on page 304 in FIG. 9.

In addition, the present application does not limit the display manner of the above "set of target objects". For example, it may occupy a small area of the above object aggregation page (for example, the area occupied by the set of objects corresponding to the category "recommended" within page 205 in FIG. 7) for display. As another example, the set of target object may also occupy most of the area of the object aggregation page (for example, the area occupied by the set of objects corresponding to the category "recommended" within page 206 in FIG. 8).

Figure 7:
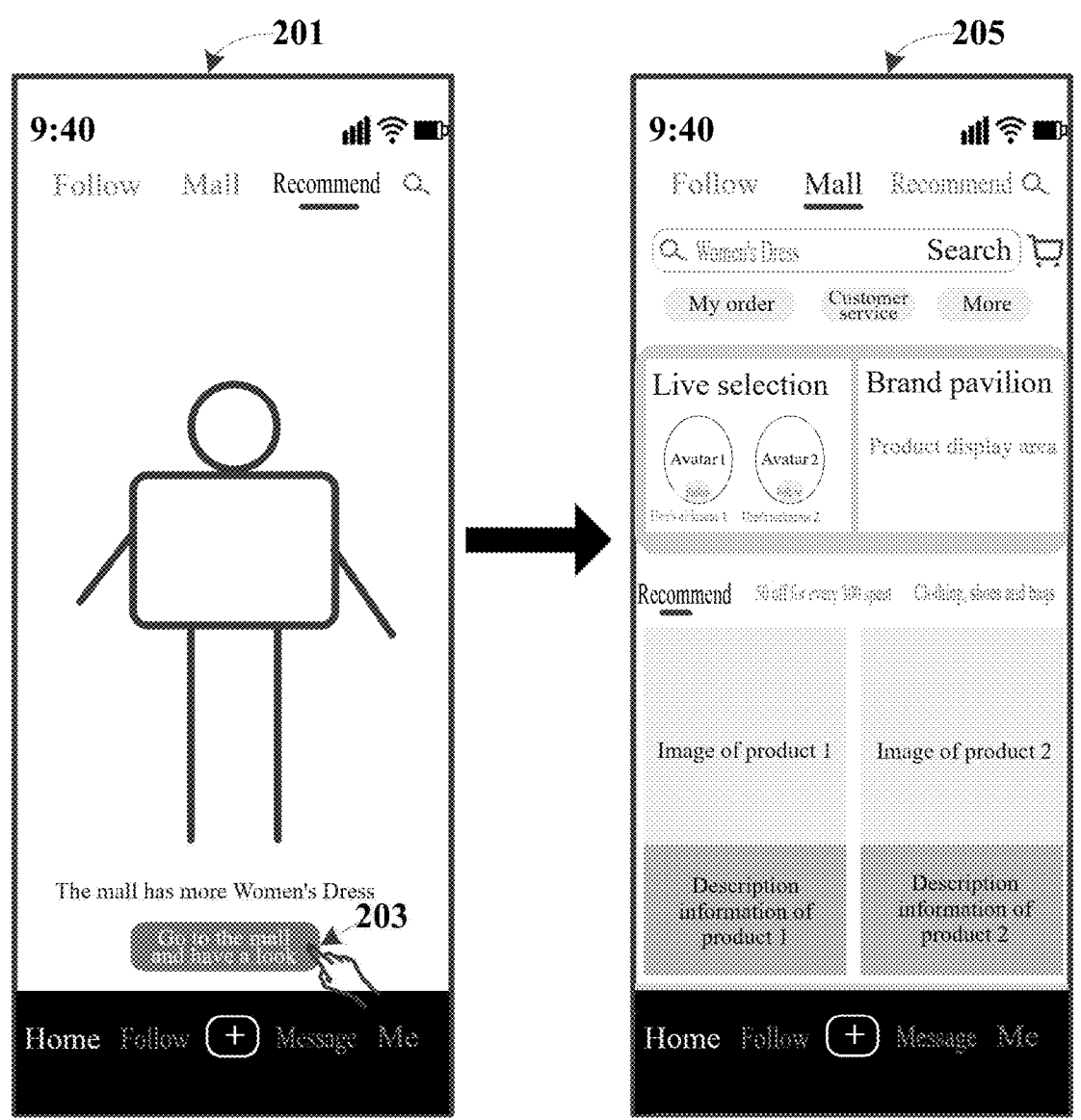
FIG. 7 is a schematic diagram of a display process of an object aggregation page provided by the present application.

Based on the relevant content of the above Case 1, it may be known that, in some application scenarios, if the above "multiple first objects" come from a set of objects corresponding to a certain tag in the above object aggregation page, after jumping from the above video display page to the object aggregation page, the set of target objects may be displayed immediately on the object aggregation page according to a preset first display manner (for example, the display manner of the set of objects shown in FIG. 7 or FIG. 8), so that the user can better view these first objects by means of the object aggregation page. Wherein, the first display manner refers to the page display manner configured in advance for the set of target objects, and the present application does not limit the first display manner.

Case 2: In some application scenarios, the display page of the above "multiple first objects" (for example, page 404 in FIG. 10) is independent of the above object aggregation page.

Based on the relevant content of Case 2 in the above paragraph, it may be known that, in some implementations, when a binding page corresponding to the above guidance control includes the above multiple first objects, and the binding page is different from the above object aggregation page, the above S3 may specifically be: in response to a trigger operation for the guidance control, jumping from the above video display page to the object aggregation page, and displaying the binding page on the object aggregation page. Wherein, the binding page refers to an object display page configured in advance for the guidance control; and the present application does not limit the binding page. For example, when the guidance control is control 402 in FIG. 10, the binding page may be referred to page 404 in FIG. 10.

Based on the relevant content of the above Case 2, it may be known that, in some application scenarios, if the above "multiple first objects" come from the binding page corresponding to the above guidance control, after jumping from the above video display page (for example, page 401 in FIG. 10) to the object aggregation page, the binding page (for example, page 404 in FIG. 10) may be displayed immediately on the object aggregation page according to a preset second display manner (for example, the display manner used for page 404 in FIG. 10), so that the user can better view these first objects by means of the binding page. Wherein, the second display manner refers to the page display manner configured in advance for the binding page, and the present application does not limit the second display manner (for example, a display manner for a drop-down page).

Based on the relevant content of the display manner of the above "multiple first objects", it may be known that, in different application scenarios, different display manners may be adopted for the "multiple first objects" to ensure that after jumping to the object aggregation page, the user can view these first objects directly by means of the object aggregation page, which is beneficial to improving the experience of the user to view objects.

In fact, in order to better improve the user experience, the present application further provides some implementations of the above S3. In this implementation, when the above target video data is used to display multiple second objects, and the above object aggregation page includes a search trigger area, the S3 may specifically be: in response to a trigger operation for the above guidance control, jumping from the above video display page to the object aggregation page, and displaying a target search word within the search trigger area of the object aggregation page, the target search word being determined according to the multiple second objects corresponding to the target video data.

The above "search trigger area" refers to an area that exists in the above object aggregation page and is used to trigger object search processing for a certain keyword; and the present application does not limit the implementation of the "search trigger area", for example, it may be implemented by means of a search box (for example, the search box shown on page 205 in FIG. 7, page 206 in FIG. 8, page 304 in FIG. 9, or page 403 in FIG. 10).

The above "target search word" refers to a search word displayed by default in the above search trigger area when jumping to the above object aggregation page. For example, it may be the search word "women's dress" that appears in the search box shown on page 205 in FIG. 7.

In addition, the present application does not limit the display manner of the above "target search word". For example, it may be implemented by using any existing or future emerging method of displaying default search words in a search box.

In addition, the present application does not limit the determination process of the above "target search word". For example, it may specifically be: determining first a target category according to multiple second objects corresponding to the above target video data, so that the target category can represent which category these second objects belong to (for example, women's dress); then determining the target category as the target search word, so that subsequent users can directly search for some objects under the target category by means of the target search word in the above object aggregation page, which is beneficial to improving the user experience of product searching.

In addition, the present application does not limit the working principle of the above "search trigger area". For example, it may specifically include Step 21 below.

Step 21: When a target search word is displayed in the above search trigger area, in response to a preset operation triggered for the search trigger area, displaying object search results corresponding to the target search word on the above object aggregation page.

Wherein, the preset operation may be set in advance. For example, when a target search word is displayed in a grayed-out manner in the above search trigger area, the preset operation may specifically be the following sequence of operations: first clicking on the above search trigger area, so as to switch the target search word in the search trigger area from an unusable state to a usable state; then directly clicking a search trigger button in the search trigger area. It should be noted that the target search word in the gray-out manner is used to indicate that the target search word is in an unavailable state.

The above "object search results corresponding to the target search word" refers to the results obtained by searching according to the target search word, so that the "object search results corresponding to the target search word" can represent some objects having relatively large association with the target search word. In addition, the present application does not limit the manner of determining the "object search results corresponding to the target search word". For example, it may be implemented by adopting any existing or future emerging method that can determine the "object search results corresponding to the target search word".

Based on the relevant content of the above "search trigger area", it may be known that, for an electronic device, when a video display page (for example, page 201 in FIG. 7, page 201 in FIG. 8, page 301 in FIG. 9, or page 401 in FIG. 10) is being displayed on the electronic device, and a guidance control (for example, control 203 in FIG. 7, control 203 in FIG. 8, control 303 in FIG. 9 or the control 402 in FIG. 10) corresponding to the target video data is displayed on the video display page, after the electronic device receives a trigger operation (for example, a click operation, etc.) for the guidance control, it jumps from the video display page to an object aggregation page, and displays a target search word within a search trigger area of the object aggregation page, so that the target search word can represent the category of the object displayed in the target video data, so that subsequent users can search for other objects under the category by means of the target search word, so that it can satisfy the needs of the users to search for other objects under this category by means of the object aggregation page, thereby better improving the user experience.

Based on the relevant contents of S1 to S3 above, it may be known that, for the information display method provided by the embodiments of the present application, when a video display page is being displayed on the electronic device, and the video display page is used to display a video stream composed of multiple candidate video data corresponding to the video display page, if target video data in these candidate video data is being played on the video display page, then when it is determined that a preset guidance condition corresponding to the target video data is reached, a guidance control corresponding to the target video data and guidance prompt text corresponding to the guidance control are added on the video display page, so that the guidance prompt text can indicate that a user can directly enter an object aggregation page (for example, a platform page) by means of the guidance control, and can also indicate which objects the user viewed in the object aggregation page (for example, products involved in buy-and-save activities, etc.), so that after receiving a trigger operation for the guide control, jumping directly from the video display page to the object aggregation page, so that the object aggregation page is used to display multiple first objects, and these first objects are all determined from multiple candidate objects corresponding to the guidance prompt text. In this way, the purpose of directly entering the object aggregation page from a piece of video data can be achieved, thereby effectively simplifying the entry process of the object aggregation page, and further effectively alleviating the adverse effects caused by the complicated entry process of the object aggregation page, which can effectively improve the user experience.

Based on the information display method provided by the embodiments of the present application, an embodiment of the present application further provides an information display apparatus, which will be explained and described below with reference to FIG. 11. Wherein, FIG. 11 is a schematic structural diagram of an information display apparatus provided by an embodiment of the present application. It should be noted that, technical details of the information display apparatus provided by the embodiment of the present application may refer to the relevant content of the information display method above.

As shown in FIG. 11, the information display apparatus 1100 provided by the embodiment of the present application comprises:

a video playback unit 1101 configured to play target video data on a video display page, the target video data being any of multiple candidate video data corresponding to the video display page;

a content adding unit 1102 configured to add a guidance control corresponding to the target video data and a guidance prompt text corresponding to the guidance control on the video display page when a preset guidance condition corresponding to the target video data is reached;

a page jump unit 1103 configured to, in response to a trigger operation for the guidance control, jump from the video display page to an object aggregation page, the object aggregation page being used to display multiple first objects, the first objects being determined from multiple candidate objects corresponding to the guidance prompt text.

In some implementations, if the target video data satisfies an entry identification display condition, an object entry identification corresponding to the target video data is displayed on the video display page;

the information display apparatus 1100 further comprising: a first display unit configured to, after playing target video data on a video display page, in response to a trigger operation for the object entry identification, display an object display interface corresponding to the target video data on the video display page, the object display interface being used to display multiple second objects corresponding to the target video data;

a first cancellation unit configured to cancel the display of the object display interface on the video display page in response to a display cancellation operation triggered for the object display interface;

a result determination unit configured to determine that the preset guidance condition corresponding to the target video data is reached when it is determined that an order operation has not been triggered for any of the second objects in the object display interface.

In some implementations, the multiple candidate objects include similar objects corresponding to the multiple second objects; the similar objects being different from the second objects.

In some implementations, the first objects are determined from the multiple candidate objects according to recommendation characterization data of each of the candidate objects; the recommendation characterization data being determined according to the similarity between the candidate objects and the second objects.

In some implementations, if the target video data satisfies the entry identification display condition, when the object display interface corresponding to the target video data is displayed on the video display page, the preset guidance condition corresponding to the target video data is: cancelling the display of the object display interface on the video display page, and during the display of the object display interface, no ordering operation being triggered for any of the second objects in the object display interface; the object display interface is used to display multiple second objects corresponding to the target video data.

In some implementations, if the target video data does not satisfy the entry identification display condition, the preset guidance condition corresponding to the target video data is: the playback progress of the target video data reaching a preset progress threshold.

In some implementations, the object aggregation page includes multiple sets of recommended objects, and object categories corresponding to each set of recommended objects are different; the multiple sets of recommended objects include a set of target objects, the set of target object including the multiple first objects;

the information display apparatus 1100 further comprising: a second display unit configured to display the set of target objects on the object aggregation page after jumping from the video display page to an object aggregation page.

In some implementations, a binding page corresponding to the guidance control includes the multiple first objects;

the information display apparatus 1100 further comprising: a third display unit configured to display the binding page on the object aggregation page after jumping from the video display page to an object aggregation page.

In some implementations, the video display page displays association information of the target video data;

the information display apparatus 1100 further comprising: a second cancellation unit configured to cancel the display of the association information of the target video data on the video display page when the preset guidance condition corresponding to the target video data is reached.

In some implementations, the preset guidance condition corresponding to the target video data is determined according to the video type of the target video data.

In some implementations, the displayed content on the guidance control is determined according to the page identification of the object aggregation page.

In some implementations, the object aggregation page includes a search trigger area;

the information display apparatus 1100 further comprising: a fourth display unit configured to, after jumping from the video display page to an object aggregation page, displaying a target search word in the search trigger area, the target search word being determined according to multiple second objects corresponding to the target video data;

a fifth display unit configured to display object search results corresponding to the target search word on the object aggregation page in response to a preset operation triggered for the search trigger area.

In some implementations, the object aggregation page is a platform page.

Based on the relevant content of the above information display apparatus 1100, it may be known that, for the information display apparatus 1100 provided by the embodiment of the present application, when a video display page is being displayed on the information display apparatus 1100, and the video display page is used to display a video stream composed of multiple candidate video data corresponding to the video display page, if target video data in these candidate video data is being played on the video display page, then when it is determined that a preset guidance condition corresponding to the target video data is reached, a guidance control corresponding to the target video data and guidance prompt text corresponding to the guidance control are added on the video display page, so that the guidance prompt text can indicate that a user can directly enter an object aggregation page (for example, a platform page) by means of the guidance control, and can also indicate which objects the user viewed in the object aggregation page (for example, products involved in buy-and-save activities, etc.), so that after receiving a trigger operation for the guide control, jumping directly from the video display page to the object aggregation page, so that the object aggregation page is used to display multiple first objects, and these first objects are all determined from multiple candidate objects corresponding to the guidance prompt text. In this way, the purpose of directly entering the object aggregation page from a piece of video data can be achieved, thereby effectively simplifying the entry process of the object aggregation page, and further effectively alleviating the adverse effects caused by the complicated entry process of the object aggregation page, which can effectively improve the user experience.

In addition, an embodiment of the present application further provides an electronic device, the device comprising a processor and a memory: the memory is configured to store instructions or computer programs; the processor is configured to execute the instructions or computer programs in the memory, so that the electronic device executes any implementation of the information display method provided by the embodiments of the present application.

Referring to FIG. 12, a schematic structural diagram of an electronic device 1200 suitable for implementing embodiments of the present disclosure is shown. The terminal device in the embodiments of the present disclosure may include but not limited to a mobile terminal such as a mobile phone, a notebook, a digital broadcast receiver, a PDA (Personal Digital Assistant), a PAD (tablets), a PMP (Portable Multimedia Player), a vehicle-mounted terminal (such as a car navigation terminal) etc. and a fixed terminal such as a digital TV, a desktop computer, etc. The electronic device shown in FIG. 12 is only one example, and should not bring any limitation to the functions and scope of usages of the embodiments of the present disclosure.

As shown in FIG. 12, the electronic device 1200 may include a processing apparatus (for example a central processing unit, a graphics processor, etc.) 1201, which can execute various appropriate actions and processes according to a program stored in a read-only memory (ROM) 1202 or a program loaded from a storage apparatus 1208 into a random-access memory (RAM) 1203. In the RAM 1203, various programs and data required for the operation of the electronic device 1200 are also stored. The processing apparatus 1201, ROM 1202, and RAM 1203 are connected to each other through a bus 1204. An input/output (I/O) interface 1205 is also connected to the bus 1204.

Generally, the following apparatus can be connected to the I/O interface 1205: an input apparatus 1206 including for example, a touch screen, a touch pad, a keyboard, a mouse, a camera, a microphone, an accelerometer, a gyroscope, etc.; an output apparatus 1207 including for example, a liquid crystal display (LCD), a speaker, a vibrator, etc.; a storage apparatus 1208 including for example, a magnetic tape, a hard disk, etc.; and a communication apparatus 1209. The communication apparatus 1209 may allow the electronic device 1200 to perform wireless or wired communication with other devices to exchange data. Although FIG. 12 shows an electronic device 1200 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 1209, or installed from the storage apparatus 1208, or installed from the ROM 1202. When the computer program is executed by the processing apparatus 1201, the above functions defined in the methods of the embodiments of the present disclosure are executed.

The electronic device provided by the embodiments of the present disclosure and the method provided by the above embodiments belong to the same inventive concept. Technical details that are not described in detail in this embodiment may be referred to the above embodiments, and this embodiment has the same beneficial effects as the above embodiments.

An embodiment of the present application further provides a computer-readable medium having instructions or computer programs stored thereon, which, when run on a device, cause the device to execute any implementation of the information display method provided by the embodiments of this application.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The aforementioned computer-readable medium may be included in aforementioned electronic devices; or it may exist alone without being assembled into the electronic device.

The aforementioned computer-readable medium carries one or more programs, which, when executed by the electronic device, cause the electronic device being able to perform the above methods.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure may be implemented in software or hardware. Wherein, the name of the unit/module does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

It should be noted that various embodiments in this specification are described in a progressive manner, and each embodiment focuses on its differences from other embodiments. The same and similar parts between the various embodiments may be referred to each other. As for the system or apparatus disclosed in the embodiments, since they correspond to the method disclosed in the embodiment, the description thereof is relatively simple, and relevant details may refer to the description in the method section.

It should be understood that in the present application, "at least one (item)" refers to one or more, and "a plurality of" refers to two or more. "And/or" is used to describe association relationship between associated objects, indicating that there may be three relationships. For example, "A and/or B" may represent three situations: only A exists, only B exists, and A and B exist simultaneously, where A and B may be singular or plural. The character "/" generally represents that the association objects are in an "or" relationship. "At least one item (piece) of the following" or similar expressions thereof refers to any combination of these items, including any combination of a single item (piece) or a plurality of items (pieces). For example, at least one item (piece) of a, b or c may represent: a, b, c, "a and b", "a and c", "b and c", or "a and b and c", where a, b, c may be single or a plurality of.

It should also be noted that, here, relative terms such as first and second are only used to distinguish one entity or operation from another entity or operation, and do not necessarily require or imply any such actual relationship or order between these entities or operations. Furthermore, the term "comprises", "includes" or any other variation thereof is intended to cover a non-exclusive inclusion such that a process, method, article or device comprising a series of elements includes not only those elements, but also includes elements not expressly listed, or elements inherent in such process, method, article, or device. Without further limitations, an element defined by the phrase "comprising one . . . " does not exclude the presence of additional identical elements in the process, method, article or apparatus comprising said element.

The steps of the methods or algorithms described in conjunction with the embodiments disclosed herein may be implemented directly in hardware, in software module executed by a processor, or in a combination of thereof. The software module may be located in a Random Access Memory (RAM), a memory, a read-only memory (ROM), an electrically programmable ROM, an electrically erasable programmable ROM, a register, a hard disk, a removable disk, a CD-ROM, or any other form of storage media known in the technical field.

The above description of the disclosed embodiments enables those skilled in the art to implement or use the present application. Various modifications to these embodiments will be readily apparent to those skilled in the art, and the generic principles defined herein may be practiced in other embodiments without departing from the spirit or scope of the application. Therefore, the present application is not to be limited to the embodiments shown herein but is to be accorded the widest scope consistent with the principles and novel features disclosed herein.

What is claimed is:

1. An information display method, comprising:
playing target video data on a video display page, the target video data being any of multiple candidate video data corresponding to the video display page;
adding a guidance control corresponding to the target video data and a guidance prompt text corresponding to the guidance control on the video display page when a preset guidance condition corresponding to the target video data is reached; and
in response to a trigger operation for the guidance control, jumping from the video display page to an object aggregation page, the object aggregation page being used configured to display multiple first objects, the first objects being determined from multiple candidate objects corresponding to the guidance prompt text,
wherein if the target video data satisfies an entry identification display condition, when an object display interface corresponding to the target video data and configured to display multiple second objects corresponding to the target video data is displayed on the video display page, the preset guidance condition corresponding to the target video data is: cancelling the display of the object display interface on the video display page, and during the display of the object display interface, no ordering operation being triggered for any of the second objects in the object display interface.

2. The method according to claim 1, wherein if the target video data satisfies an entry identification display condition, an object entry identification corresponding to the target video data is displayed on the video display page;

after the playing target video data on a video display page, the method further comprising:

in response to a trigger operation for the object entry identification, displaying the object display interface corresponding to the target video data on the video display page;

in response to a display cancellation operation triggered for the object display interface, cancelling the display of the object display interface on the video display page;

when it is determined that no order operation has been triggered for any of the second objects in the object display interface, determining that the preset guidance condition corresponding to the target video data is reached.

3. The method according to claim 2, wherein the method comprises at least one of the following:

the multiple candidate objects include similar objects corresponding to the multiple second objects; the similar objects being different from the second objects; and the first objects are determined from the multiple candidate objects according to recommendation characterization data of each of the candidate objects; the recommendation characterization data being determined according to the similarity between the candidate objects and the second objects.

4. The method according to claim 1, wherein if the target video data does not satisfy the entry identification display condition, the preset guidance condition corresponding to the target video data is: a playback progress of the target video data reaching a preset progress threshold.

5. The method according to claim 1, wherein the object aggregation page includes multiple sets of recommended objects, and object categories corresponding to each set of recommended objects are different; the multiple sets of recommended objects include a set of target objects, the set of target object including the multiple first objects;

after the jumping from the video display page to the object aggregation page, the method further comprising:

displaying the set of target objects on the object aggregation page.

6. The method according to claim 1, wherein a binding page corresponding to the guidance control includes the multiple first objects;

after the jumping from the video display page to the object aggregation page, the method further comprising:

displaying the binding page on the object aggregation page.

7. The method according to claim 1, wherein the video display page displays association information of the target video data;

the method further comprising:

when the preset guidance condition corresponding to the target video data is reached, cancelling the display of the association information of the target video data on the video display page.

8. The method according to claim 1, wherein the method comprises at least one of the following:

the preset guidance condition corresponding to the target video data is determined according to a video type of the target video data; and displayed content on the guidance control is determined according to a page identification of the object aggregation page.

9. The method according to claim 1, wherein the object aggregation page includes a search trigger area;

after the jumping from the video display page to the object aggregation page, the method further comprising:

displaying a target search word in the search trigger area, the target search word being determined according to the multiple second objects corresponding to the target video data;

in response to a preset operation triggered for the search trigger area, displaying object search results corresponding to the target search word on the object aggregation page.

10. The method according to claim 1, wherein the object aggregation page is a platform page.

11. An electronic device, comprising:

a processor and a memory;

the memory configured for storing instructions or computer programs;

the processor configured for executing the instructions or computer programs in the memory, so that the electronic device executes an information display method, wherein the information display method comprises:

playing target video data on a video display page, the target video data being any of multiple candidate video data corresponding to the video display page;

adding a guidance control corresponding to the target video data and a guidance prompt text corresponding to the guidance control on the video display page when a preset guidance condition corresponding to the target video data is reached; and in response to a trigger operation for the guidance control, jumping from the video display page to an object aggregation page, the object aggregation page being configured to display multiple first objects, the first objects being determined from multiple candidate objects corresponding to the guidance prompt text, wherein if the target video data satisfies an entry identification display condition, when an object display interface corresponding to the target video data and configured to display multiple second objects corresponding to the target video data is displayed on the video display page, the preset guidance condition corresponding to the target video data is: cancelling the display of the object display interface on the video display page, and during the display of the object display interface, no ordering operation being triggered for any of the second objects in the object display interface.

12. A non-transitory computer-readable medium, characterized in that, the non-transitory computer-readable medium having instructions or computer programs stored thereon, which, when run on a device, cause the device to execute an information display method, wherein the information display method comprises:

playing target video data on a video display page, the target video data being any of multiple candidate video data corresponding to the video display page;

adding a guidance control corresponding to the target video data and a guidance prompt text corresponding to the guidance control on the video display page when a preset guidance condition corresponding to the target video data is reached; and in response to a trigger operation for the guidance control, jumping from the video display page to an object aggregation page, the object aggregation page being used configured to display multiple first objects, the first objects being determined from multiple candidate objects corresponding to the guidance prompt text, wherein if the target video data satisfies an entry identification display condition, when an object display interface corresponding to the target video data and configured to display multiple second objects corresponding to the target video data is displayed on the video display page, the preset guidance condition corresponding to the target video data is: cancelling the display of the object display interface on the video display page, and during the display of the object display interface, no ordering operation being triggered for any of the second objects in the object display interface.

13. The non-transitory computer-readable medium according to claim 12, wherein if the target video data satisfies an entry identification display condition, an object entry identification corresponding to the target video data is displayed on the video display page;

after the playing target video data on a video display page, the information display method further comprises:

in response to a trigger operation for the object entry identification, displaying the object display interface corresponding to the target video data on the video display page;

in response to a display cancellation operation triggered for the object display interface, cancelling the display of the object display interface on the video display page;

when it is determined that no order operation has been triggered for any of the second objects in the object display interface, determining that the preset guidance condition corresponding to the target video data is reached.

14. The non-transitory computer-readable medium according to claim 12, wherein if the target video data does not satisfy the entry identification display condition, the preset guidance condition corresponding to the target video data is: a playback progress of the target video data reaching a preset progress threshold.

15. The non-transitory computer-readable medium according to claim 12, wherein the object aggregation page includes multiple sets of recommended objects, and object categories corresponding to each set of the recommended objects are different; the multiple sets of recommended objects include a set of target objects, the set of target object including the multiple first objects;

after the jumping from the video display page to the object aggregation page, the information display method further comprises:

displaying the set of target objects on the object aggregation page.

16. The non-transitory computer-readable medium according to claim 12, wherein a binding page corresponding to the guidance control includes the multiple first objects;

after the jumping from the video display page to the object aggregation page, the information display method further comprises:

displaying the binding page on the object aggregation page.

17. The non-transitory computer-readable medium according to claim 12, wherein the video display page displays association information of the target video data;

the information display method further comprises:

when the preset guidance condition corresponding to the target video data is reached, cancelling the display of the association information of the target video data on the video display page.

18. The non-transitory computer-readable medium according to claim 12, wherein the method comprises one of the following:

the preset guidance condition corresponding to the target video data is determined according to a video type of the target video data; and displayed content on the guidance control is determined according to a page identification of the object aggregation page.

* * * * *